(12) United States Patent
Shaw et al.

(10) Patent No.: US 7,674,071 B2
(45) Date of Patent: Mar. 9, 2010

(54) METHOD OF BEACH RENOURISHMENT USING SAND-ENTRAPPING WATTLES

(75) Inventors: Mark D. Shaw, Ponte Vedra Beach, FL (US); J. Tad Heyman, Atlantic Beach, FL (US)

(73) Assignee: Ultratech International, Inc., Jacksonville, FL (US)

( * ) Notice: Subject to any disclaimer, the term of this patent is extended or adjusted under 35 U.S.C. 154(b) by 0 days.

(21) Appl. No.: 11/827,020

(22) Filed: Jul. 10, 2007

(65) Prior Publication Data

US 2008/0014030 A1 Jan. 17, 2008

Related U.S. Application Data

(60) Provisional application No. 60/819,838, filed on Jul. 11, 2006.

(51) Int. Cl.
*E02B 3/04* (2006.01)
(52) U.S. Cl. .................. 405/15; 405/302.7; 405/74
(58) Field of Classification Search .............. 405/302.7, 405/15, 16, 74
See application file for complete search history.

(56) References Cited

U.S. PATENT DOCUMENTS

| 2,201,279 | A | 5/1940 | Willing |
| 4,353,946 | A | 10/1982 | Bowers |
| 5,338,131 | A * | 8/1994 | Bestmann ............ 405/24 |
| 5,678,954 | A | 10/1997 | Bestmann |
| 5,786,281 | A | 7/1998 | Prunty et al. |
| 6,464,428 | B1 | 10/2002 | Mikell |
| 6,626,611 | B2 | 9/2003 | Winters et al. |
| 6,986,624 | B1 | 1/2006 | Tabler |

OTHER PUBLICATIONS http://www.plant-materials.nrcs.usda.gov/pubs/stpmcpr7852.pdf printed Jan. 21, 2009 "Evaluation of Construction Techniques in the Establishment of Coastal Sand Dunes".*

* cited by examiner

*Primary Examiner*—John Kreck
(74) *Attorney, Agent, or Firm*—Thomas C. Saitta

(57) ABSTRACT

A method of using beach wattles formed of straw or like material to replenish and renourish a beach area or to create or replace sand dunes removed by storm erosion or the like, the method comprising the steps of placing wattles to entrap sand to build up a replenished mound, then positioning additional wattles on top of the replenished mound to create a higher mound, and repeating these steps as necessary until a mound or dune of desired bulk and height is created. The wattles entrap blowing or deposited sand within the interstices of the fibrous filler material to define an anchor member. The wattles can be placed end-to-end, arranged in patterns, layered or stacked in pyramidal manner.

20 Claims, 3 Drawing Sheets

METHOD OF BEACH RENOURISHMENT USING SAND-ENTRAPPING WATTLES

This application claims the benefit of U.S. Provisional Patent Application Ser. No. 60/819,838, filed Jul. 11, 2006.

BACKGROUND OF THE INVENTION

This invention relates generally to the field of beach renourishment or replenishment, wherein build-up and replacement of sand or sand dunes washed away during storm situations or the like is desired. This invention involves a method of creating or restoring sand dunes and renourishing eroded beaches by the application of straw fiber rolls, bales or wattles in a controlled manner.

Wattles are devices known in the soil erosion/construction industry and are used as temporary dams or retainers to prevent erosion of soil at a construction site. The wattles are typically made of straw or other fibrous media that has been blown or augered into plastic netting in the shape of a tube, roll or log. At construction sites, the wattles are placed around the perimeter and used to prevent soil and sediment from leaving the site, or are placed horizontally along the side of a hill to help prevent rain from eroding the soil of the hill. After the projects are completed, the wattles are typically removed. In contrast, the method of the invention at hand involves permanent placement of the wattles in order to entrap sand particles in a controlled manner, and also includes multiple applications of wattles in layers so as to construct a sand dune or area of renourishment on the beach in successive steps, such that at any given point in time the physical and visual intrusion of the renourishment devices are minimized. The method also involves initial burial of the wattles in order to define core anchors to a larger buildup of sand.

Currently the primary approach to address the problems of beach erosion is to place wood snow fencing at angles to the prevailing winds so that as sand is blown towards the dunes, the sand hits the slats of the fence and fall to the bottom of the fence. There are several disadvantages to this method. The fences are eyesores and do not blend with the natural surroundings. The fences have been recognized as a deterrent and hindrance to sea turtles laying eggs and for the hatchings to maneuver around to get to the sea. They are a safety hazard as they are typically left in place and as they deteriorate, the stakes, wire and slats become hazardous objects capable of cutting or stabbing beachgoers. They are static in their use so sand builds up only next to the fence and there is not a method for creating sand dunes or build-up in the areas between the fences.

SUMMARY OF THE INVENTION

The invention is a method of using beach wattles formed of straw or like material to replenish and renourish a beach area or to create or replace sand dunes removed by storm erosion or the like, the method comprising the steps of placing wattles to entrap sand to build up a replenished mound, then positioning additional wattles on top of the replenished mound to create a higher mound, and repeating these steps as necessary until a mound or dune of desired bulk and height is created. The wattles entrap blowing or deposited sand within the interstices of the fibrous filler material to define an anchor member. The wattles can be placed end-to-end, arranged in various configurations, curved, stacked in pyramidal or layered manner, etc.

DETAILED DESCRIPTION OF THE INVENTION

Figure 1:
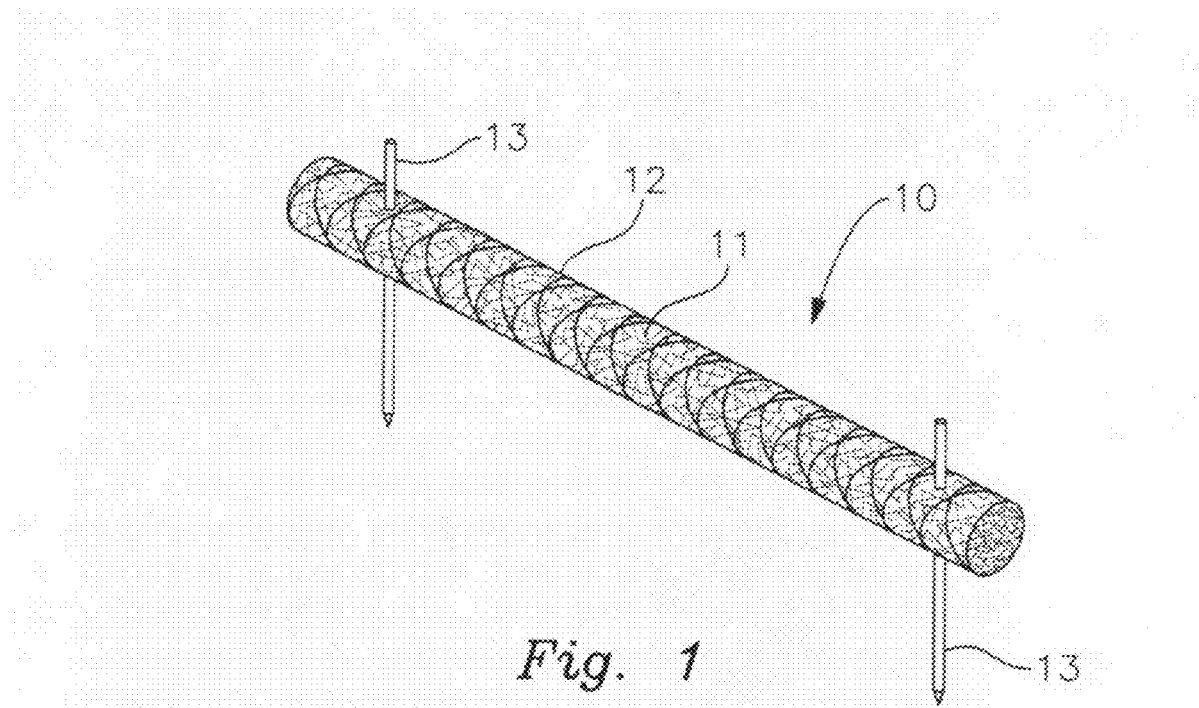
FIG. 1 is a perspective view of a representative wattle, shown with anchoring stakes driven through the main body.

With reference to the drawings, the invention will be described in detail with regard for the best mode and the preferred embodiment.

The method teaches the use of elongated, loosely matted structures, referred to as a wattles 10, made out of organics filler material 11 that are bound together using netting 12 or similar apertured containment means to prevent wind and rain from washing the filler material out of the structure. Inorganic materials could also be used as filler material 11, but would likely more expensive to achieve similar results. The preferred material of composition for the wattles 10 is straw. The wattles 10 can be any diameter and length, but normally would be used in 7 to 20 inch diameters and in lengths of from about 10 to 25 feet due to handling, weight and shipping factors. The wattles 10 can be non-cylindrical.

The wattles 10 are placed along a beach surface or sand dune 99 in a pattern or positions that will create and build-up replenished mounds or new dunes 98 in these areas by entrapping wind-blown sand or retaining sand deposited in desired locations. The wattles 10 are typically made of straw that has been blown or augered into plastic netting 12 in the shape of a tube, roll or log. Preferably the plastic used in the netting 12 is photodegradable and will therefore not present a long-term threat to the environment. Typically the polyethylene will disintegrate within 2 years or so. The wattles 10 are held in place using wood stakes 13 (preferred), wire stakes or pins. These are hammered vertically through the top of the wattle 10 every 2 to 4 feet along the wattle 10 and are preferably long enough to be hammered into the surface sand 99 another 12" to 30".

Figure 2:
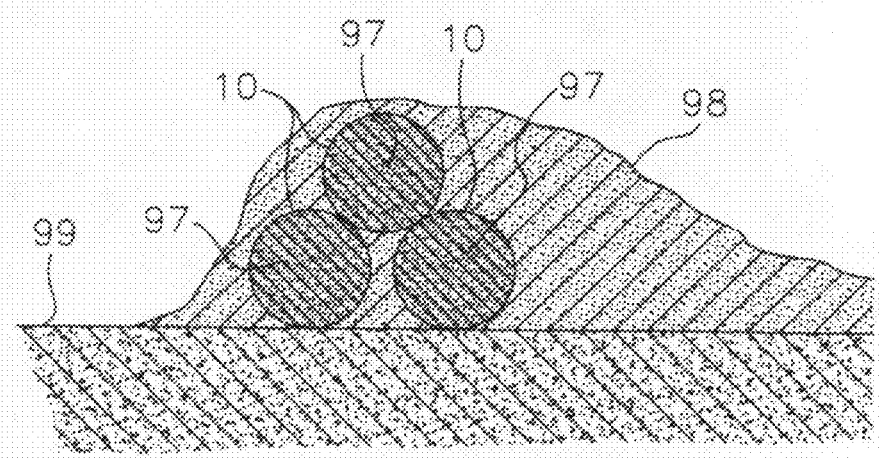
FIG. 2 is a cross-sectional view of three wattles stacked to create a sand barrier.
Figure 3:
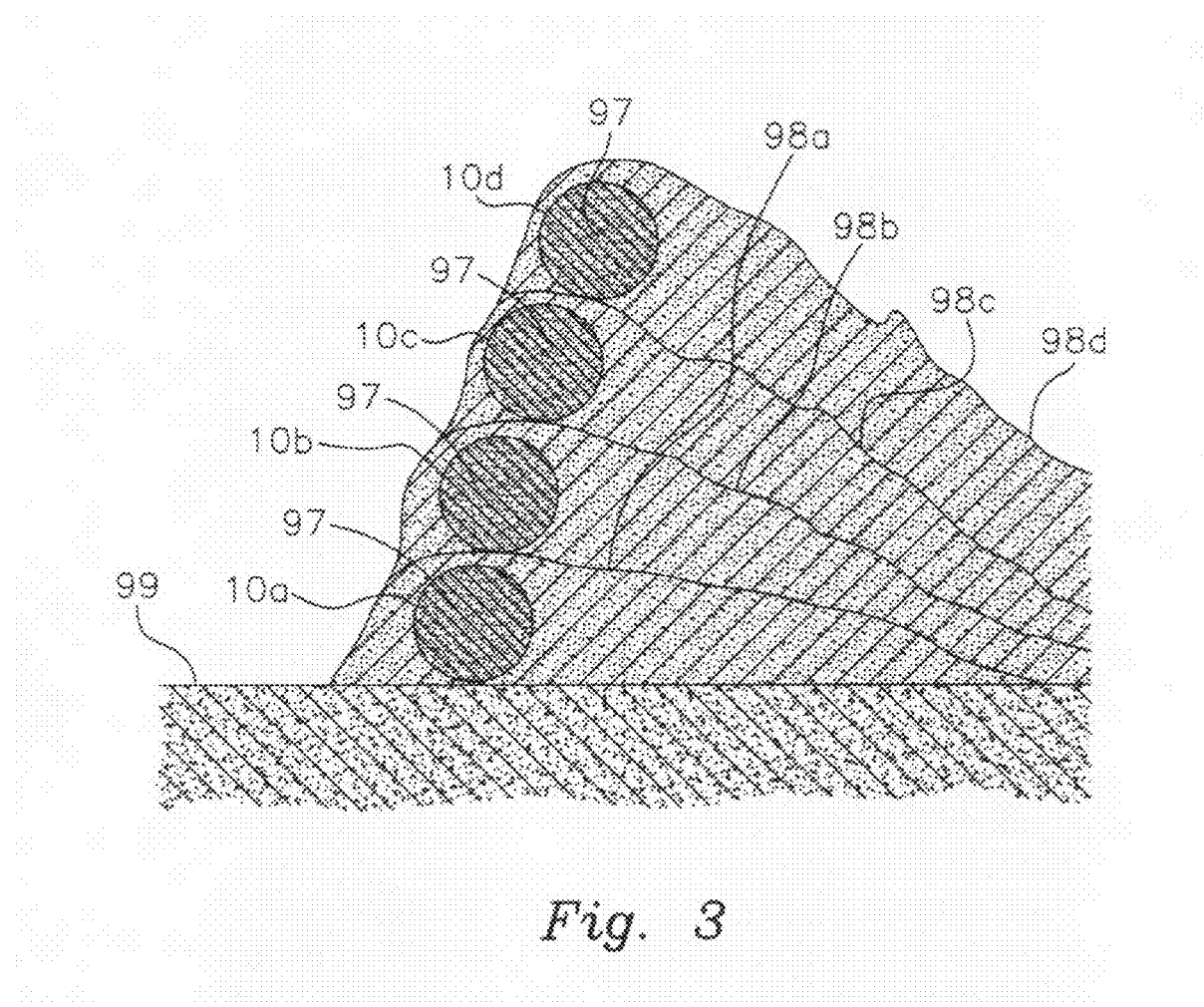
FIG. 3 is a cross-sectional view showing the result of four successive applications of a single wattle, showing how a deep mound of sand can be created incrementally.

Once the wattles 10 are in place, the fibrous nature of the straw defines interstitial spaces that entrap sand 97 within the wattle 10. The physical presence of the wattles 10 blocks the blowing sand and creates replenished mounds or dunes 98. In its basic method of use, as shown in FIG. 3, a first wattle 10a is positioned on the beach surface 99. When this wattle 10 becomes covered with sand to form a first mound 98a, a second wattle 10b is placed on top of that newly made dune 98a. When a second mound 98b has accumulated, a third wattle 10c is set out and a third mound 98c is created, then a fourth wattle 98d is set out and fourth mound 98d is created, etc. Over time, a large mound or dune 98 is the result. Other alternative methods would be to form a pyramid out of three or more wattles 10 as seen in FIG. 2. This forms a greater width and height initially and can be built-up from there. The shapes, number of wattles 10 used in conjunction with each other and the areas they are used in at the beach can be an infinite number as every location will have different needs.

Figure 4:
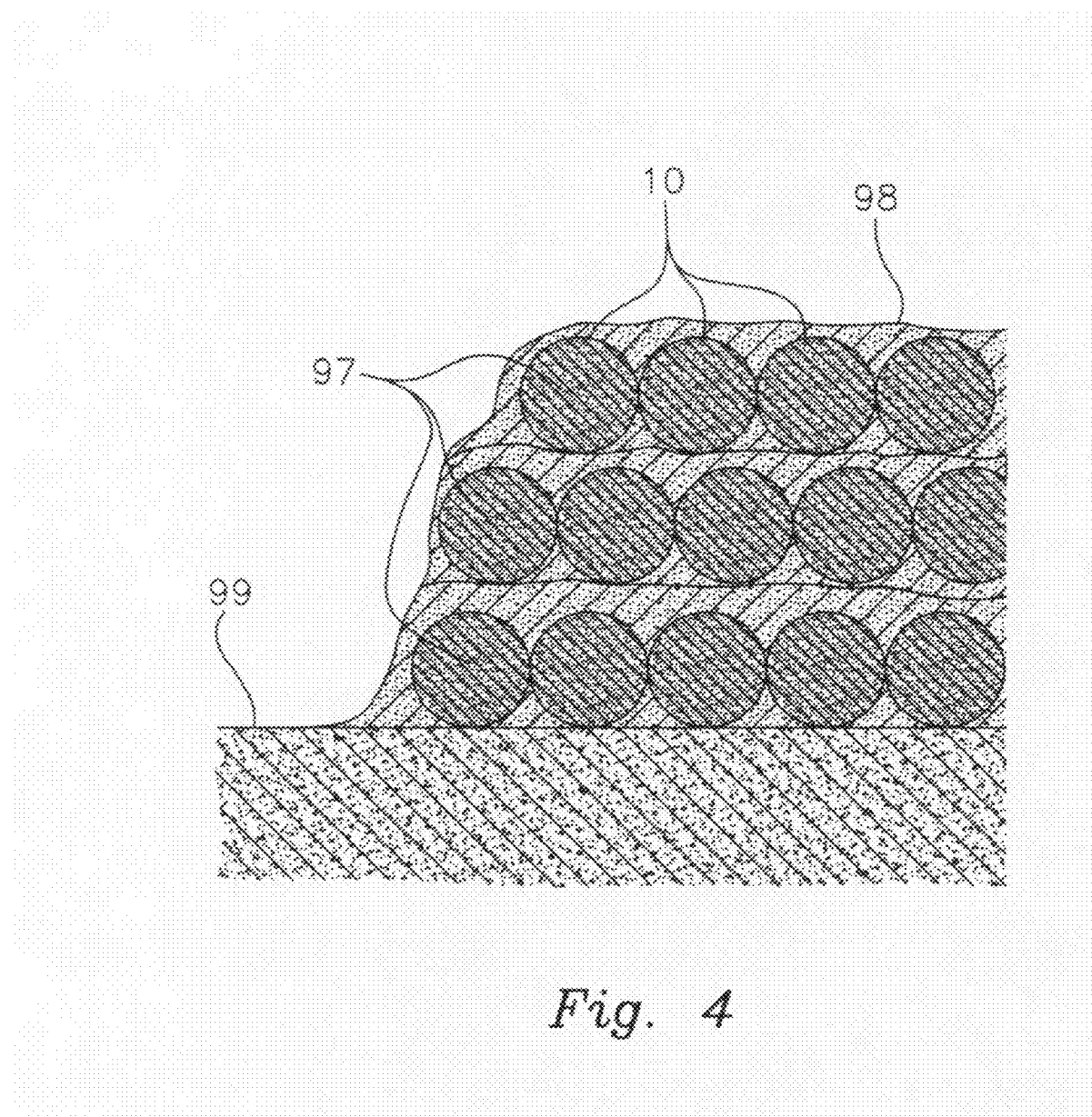
FIG. 4 is a cross-sectional view showing a dune created by successive stacking of multiple layers of wattles.

Another method for use is to place the wattles 10 inlayers to act as anchors to create higher dunes 98, as shown in FIG. 4. Then sand can be dumped on top of these wattles 10 and allowed to filter into the wattles 10 to secure the sand 97, much like the dune plant's root system secures the sand. Sand can be brought in by truck, pumped from off shore or pulled right from the beach near the dune. Once a first layer has been impregnated with sand 97, a second layer of wattles 10 is laid down and more sand is added. This layering is then continued until the desired height of sand dune 98 is created. This is a "jump-start" method that can allow immediate build-up of dunes and a method of allowing them to hold together. The previously mentioned methods can be used on top of these jump-started dunes to further the height and width on a long-term, on-going basis.

Some of the benefits of this method are as follows:

The beach wattles 10, usually made of straw and other natural fibrous materials, blend in visually as they are sand colored to begin with. They also have a much lower profile than a 3 foot high snow fence and are more visually pleasing. The wattles 10 are left in place to be covered over by blowing sand. In place and covered, they eventually biodegrade.

The wattles 10 offer additional nutrients and water holding ability to help allow natural dune plant life to grow onto, into and through the wattles 10 as they cover with sand. This is important since it is the plant life that helps secure the sand from further erosion on a long-term basis.

The low profile nature of the wattles 10 is not detrimental to sea turtles egg-laying process and hatchings.

There is no real safety hazard associated with wattles 10.

It is also possible to pre-seed the wattles 10 at the factory where they are made, with watering them once in place to make the seeds germinate. The wattles 10 could also be seeded once they are in place. Additionally, sprigs of growing plants can pre-planted into the wattles 10 after they have been put into place.

Furthermore, the straw or fiberous materials can be preimpregnated with fertilizer to help promote plant growth or can have polymer jell worked into the matrix to help retain moisture to promote plant growth.

The aforementioned jump-start technique can be a real advancement for large scale beach renourishment projects. In many cases, a state will spend several years and millions of dollars pumping sand onto a beach, creating a thicker beach and more dunes at the back of the beach, only to have the effort wash away within a year of completion and having to start all over again. The use of wattles 10 to help hold the beach together is akin to having plants literally all over the surface of the sand with their fibrous root system underneath holding the dunes and sand together. Given the economies of the wattles, large-scale use of wattles 10 for beach renourishment is practical and possible.

Additionally, the method of using straw blankets that are held together by stitching could be used as an underlayer to act like fibrous roots as a base to sand being pumped or dumped onto a beach or as a means to further create sand dunes.

It is understood and contemplated that equivalents and substitutions for certain steps and elements set forth above may be obvious to those skilled in the art, and therefore the true scope and definition of the invention is to be as set forth in the following claims.

The invention claimed is:

1. A method of creating a sand dune comprising the steps of:
   providing a plurality of wattles, said wattles comprising filler material retained within tubular netting members, said filler material having interstices able to receive and retain sand;
   placing at least one said wattle at a location where creation of a sand dune is desired;
   allowing sand to build-up beside and on top of said at least one wattle to form a first mound, said sand infiltrating into the interior of said wattle;
   placing at least one other wattle on top of said first mound; and
   allowing sand to build-up beside and on top of said at least one other wattle to form a second mound, said sand infiltrating into the interior of said other wattle;
   whereby said first and said second mound in combination define a sand dune.

2. The method of claim 1, further comprising the steps of repeating said wattle placement step and said sand build-up step until the desired height for said sand dune is achieved.

3. The method of claim 1, wherein said steps of placing said wattles comprises placement of plural wattles in a single layer.

4. The method of claim 1, wherein said steps of placing said wattles comprises placement of plural wattles in a pyramid.

5. The method of claim 1, wherein said step of allowing sand to build-up comprises directly applying sand beside and on top of said wattles.

6. The method of claim 1, further comprising the step of impregnating said wattles with seeds prior to placement of said wattles.

7. The method of claim 1, further comprising the step of impregnating said wattles with fertilizer prior to placement of said wattles.

8. The method of claim 1, further comprising the step of impregnating said wattles with seeds after placement of said wattles.

9. The method of claim 1, further comprising the step of implanting said wattles with plants after placement of said wattles.

10. The method of claim 1, further comprising the step of allowing said wattles to decompose in place.

11. A method of renourishing a beach comprising the steps of:
    providing a plurality of wattles, said wattles comprising filler material retained within tubular netting members, said filler material having interstices able to receive and retain sand;
    placing at least one said wattle at a location where creation of a sand dune is desired;
    allowing sand to build-up beside and on top of said at least one wattle to form a first mound, said sand infiltrating into the interior of said wattle;
    placing at least one other wattle on top of said first mound; and
    allowing sand to build-up beside and on top of said at least one other wattle to form a second mound, said sand infiltrating into the interior of said other wattle;
    whereby said first and said second mound in combination define a sand dune.

12. The method of claim 11, further comprising the steps of repeating said wattle placement step and said sand build-up step until the desired height for said sand dune is achieved.

13. The method of claim 11, wherein said steps of placing said wattles comprises placement of plural wattles in a single layer.

14. The method of claim 11, wherein said steps of placing said wattles comprises placement of plural wattles in a pyramid.

15. The method of claim 11, wherein said step of allowing sand to build-up comprises directly applying sand beside and on top of said wattles.

16. The method of claim 11, further comprising the step of impregnating said wattles with seeds prior to placement of said wattles.

17. The method of claim 11, further comprising the step of impregnating said wattles with fertilizer prior to placement of said wattles.

18. The method of claim 11, further comprising the step of impregnating said wattles with seeds after placement of said wattles.

19. The method of claim 11, further comprising the step of implanting said wattles with plants after placement of said wattles.

20. The method of claim 11, further comprising the step of allowing said wattles to decompose in place.

* * * * *